(12) United States Patent
Dougherty

(10) Patent No.: US 6,356,426 B1
(45) Date of Patent: Mar. 12, 2002

(54) RESIDENTIAL CIRCUIT BREAKER WITH SELECTABLE CURRENT SETTING, LOAD CONTROL AND POWER LINE CARRIER SIGNALING

(75) Inventor: John J. Dougherty, Collegeville, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/356,155

(22) Filed: Jul. 19, 1999

(51) Int. Cl.[7] ................................................ H02H 3/00
(52) U.S. Cl. ...................... 361/102; 361/64; 361/93.6; 361/115
(58) Field of Search .................. 361/42–50, 64–75, 361/62, 63, 85, 87, 93, 182, 184, 93.3, 93.1, 93.6, 111, 114, 115, 102; 307/38–40, 112, 116, 125, 129, 139; 340/310.01; 335/173; 700/295

(56) References Cited

U.S. PATENT DOCUMENTS

| | | | |
|---|---|---|---|
| 3,401,363 A | 9/1968 | Vyskocil et al. | 335/17 |
| 3,443,258 A | 5/1969 | Dunham et al. | 337/79 |
| 3,596,218 A | 7/1971 | Layton | 335/17 |
| 3,596,219 A | 7/1971 | Erickson | 335/17 |
| 3,826,951 A * | 7/1974 | Mater et al. | 335/172 |
| 4,208,690 A | 6/1980 | McGinnis et al. | 361/48 |
| 4,345,288 A | 8/1982 | Kampf et al. | 361/31 |
| 4,466,071 A | 8/1984 | Russell, Jr. | 364/492 |
| 4,513,268 A | 4/1985 | Seymour et al. | 335/35 |
| 4,513,342 A | 4/1985 | Rocha | 361/94 |
| 4,552,018 A | 11/1985 | Legatti et al. | 73/431 |
| 4,573,259 A | 3/1986 | Seymour et al. | 29/602 R |
| 4,589,052 A * | 5/1986 | Dougherty | 361/96 |
| 4,598,183 A | 7/1986 | Gardner et al. | 200/50 A |
| 4,641,216 A | 2/1987 | Morris et al. | 361/45 |
| 4,641,217 A | 2/1987 | Morris et al. | 361/45 |
| 4,649,455 A * | 3/1987 | Scott | 361/93 |
| 4,658,322 A | 4/1987 | Rivera | 361/37 |
| 4,667,263 A | 5/1987 | Morris et al. | 361/42 |
| 4,672,501 A | 6/1987 | Bilac et al. | 361/96 |
| 4,686,600 A | 8/1987 | Morris et al. | 361/42 |
| 4,688,134 A | 8/1987 | Freeman et al. | 361/45 |
| 4,702,002 A | 10/1987 | Morris et al. | 29/837 |
| 4,728,914 A * | 3/1988 | Morris et al. | 335/6 |
| 4,847,850 A | 7/1989 | Kafka et al. | 372/71 |
| 4,878,143 A | 10/1989 | kalal et al. | 361/94 |
| 4,878,144 A | 10/1989 | Nebon | 361/96 |
| 4,884,164 A * | 11/1989 | Dziura et al. | 361/102 |
| 4,931,894 A | 6/1990 | Legatti | 361/45 |
| 4,936,894 A | 6/1990 | Larson et al. | 70/298 |
| 4,958,252 A * | 9/1990 | Murphy | 361/93 |
| 5,089,796 A | 2/1992 | Glennon et al. | 335/172 |
| 5,101,316 A * | 3/1992 | Levain | 361/93 |
| 5,121,282 A | 6/1992 | White | 361/42 |

(List continued on next page.)

FOREIGN PATENT DOCUMENTS

| | | |
|---|---|---|
| CA | 2036032 | 8/1991 |
| WO | WO 91/13454 | 9/1991 |
| WO | WO 95/20235 | 7/1995 |

*Primary Examiner*—Fritz Fleming
*Assistant Examiner*—Vaughn Marquis
(74) *Attorney, Agent, or Firm*—Cantor Colburn LLP; Carl B. Horton

(57) ABSTRACT

In one aspect of the present invention, a residential circuit breaker is presented. The residential circuit breaker comprises an electronic residential circuit breaker having a selectable current rating which permits the user to easily set and reset the current rating depending upon the desired use and environment in which the current breaker is to be used. In another aspect, common power line carrier (PLC) communications are used to provide an effective signaling system for load control. In yet another aspect of the present invention, an interface between the electrical infrastructure and a home automation system for the purpose of load control is provided.

12 Claims, 7 Drawing Sheets

U.S. PATENT DOCUMENTS

| | | | | |
|---|---|---|---|---|
| 5,136,457 A | * | 8/1992 | Durivage, III | 361/93 |
| 5,185,684 A | | 2/1993 | Beihoff et al. | 361/45 |
| 5,185,685 A | | 2/1993 | Tennies et al. | 361/45 |
| 5,185,686 A | | 2/1993 | Hansen et al. | 361/45 |
| 5,185,687 A | | 2/1993 | Beihoff et al. | 361/45 |
| 5,206,596 A | | 4/1993 | Beihoff et al. | 324/536 |
| 5,208,542 A | | 5/1993 | Tennies et al. | 324/544 |
| 5,223,682 A | | 6/1993 | Pham et al. | 200/148 R |
| 5,224,006 A | | 6/1993 | MacKenzie et al. | 361/45 |
| 5,229,730 A | | 7/1993 | Legatti et al. | 335/18 |
| 5,245,302 A | | 9/1993 | Brune et al. | 335/35 |
| 5,245,498 A | | 9/1993 | Uchida et al. | 361/47 |
| 5,250,918 A | | 10/1993 | Edds et al. | 335/35 |
| 5,299,730 A | | 4/1994 | Pasch et al. | 228/180.22 |
| 5,303,112 A | * | 4/1994 | Zulaski et al. | 361/67 |
| 5,303,113 A | | 4/1994 | Goleman et al. | 361/93 |
| 5,307,230 A | | 4/1994 | MacKenzie | 361/96 |
| 5,359,293 A | | 10/1994 | Boksiner et al. | 324/544 |
| 5,373,411 A | | 12/1994 | Grass et al. | 361/64 |
| 5,418,463 A | | 5/1995 | Fleming et al. | 324/520 |
| 5,420,740 A | | 5/1995 | MacKenzie et al. | 361/45 |
| 5,432,455 A | | 7/1995 | Blades | 324/536 |
| 5,434,509 A | | 7/1995 | Blades | 324/536 |
| 5,452,223 A | | 9/1995 | Zuercher et al. | 364/483 |
| 5,453,723 A | | 9/1995 | Fello et al. | 338/18 |
| 5,459,630 A | | 10/1995 | MacKenzie et al. | 361/45 |
| 5,475,609 A | | 12/1995 | Apothaker | 364/492 |
| 5,483,211 A | | 1/1996 | Carrodus et al. | 335/18 |
| 5,485,093 A | | 1/1996 | Russell et al. | 324/522 |
| 5,493,278 A | | 2/1996 | MacKenzie et al. | 340/638 |
| 5,506,789 A | | 4/1996 | Russell et al. | 364/492 |
| 5,510,946 A | | 4/1996 | Franklin | 361/56 |
| 5,510,949 A | | 4/1996 | Innes | 361/93 |
| 5,512,832 A | | 4/1996 | Russell et al. | 324/522 |
| 5,519,561 A | | 5/1996 | Mrenna et al. | 361/105 |
| 5,546,266 A | | 8/1996 | MacKenzie et al. | 361/93 |
| 5,550,751 A | | 8/1996 | Russell | 364/492 |
| 5,561,605 A | | 10/1996 | Zuercher et al. | 364/483 |
| 5,578,931 A | | 11/1996 | Russell et al. | 324/536 |
| 5,583,732 A | | 12/1996 | Seymour et al. | 361/93 |
| 5,590,012 A | | 12/1996 | Dollar, II | 361/113 |
| 5,600,526 A | | 2/1997 | Russell et al. | 361/65 |
| 5,614,878 A | | 3/1997 | Patrick et al. | 335/14 |
| 5,615,075 A | | 3/1997 | Kim | 361/87 |
| 5,629,824 A | | 5/1997 | Rankin et al. | 361/57 |
| 5,644,510 A | * | 7/1997 | Weir | 361/64 |
| 5,659,453 A | | 8/1997 | Russell et al. | 361/93 |
| 5,694,101 A | | 12/1997 | Lavelle et al. | 335/172 |
| 5,706,154 A | | 1/1998 | Seymour | 361/42 |
| 5,818,671 A | | 10/1998 | Seymour et al. | 361/42 |
| 5,831,500 A | | 11/1998 | Turner et al. | 335/17 |
| 5,861,683 A | * | 1/1999 | Engel et al. | 307/38 |
| 5,875,087 A | * | 2/1999 | Spencer et al. | 361/93 |
| 5,943,201 A | * | 8/1999 | Walker et al. | 361/64 |
| 6,084,758 A | * | 7/2000 | Clarey et al. | 361/62 |

* cited by examiner

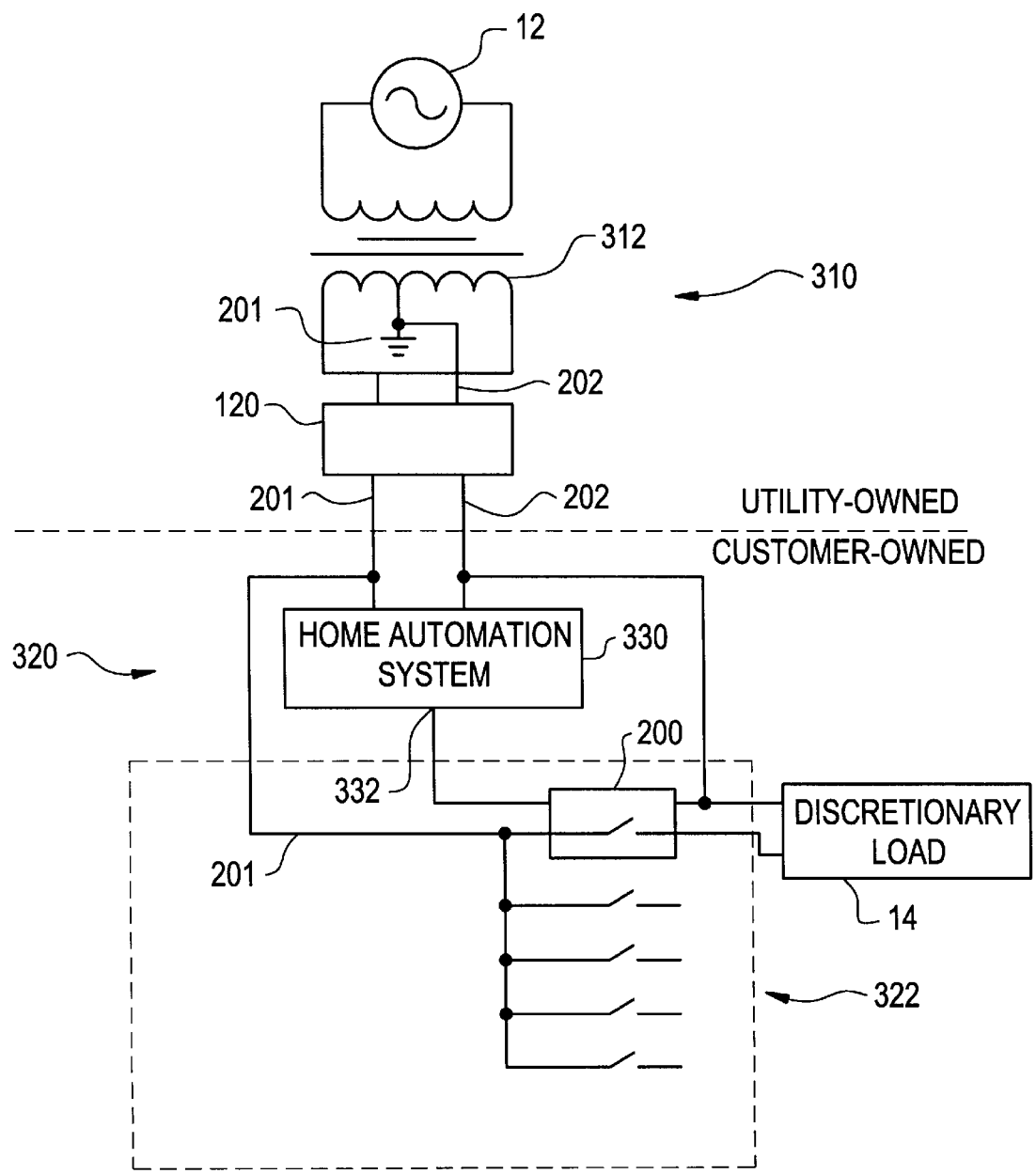

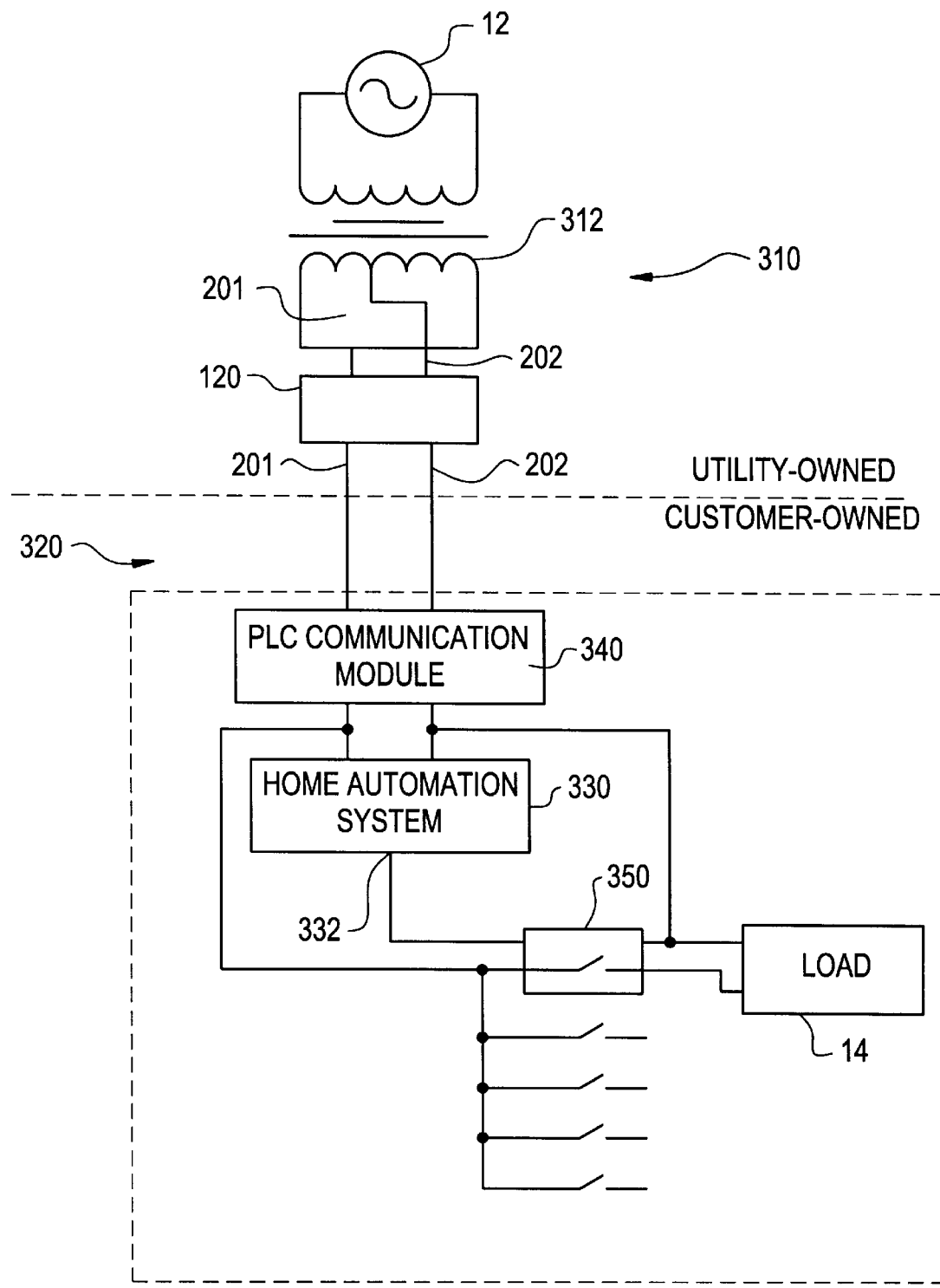

RESIDENTIAL CIRCUIT BREAKER WITH SELECTABLE CURRENT SETTING, LOAD CONTROL AND POWER LINE CARRIER SIGNALING

BACKGROUND OF THE INVENTION

The present invention relates to residential electric circuit breakers and more specifically, the present invention is directed to the use of electronics in a residential or miniature circuit breaker such that the current setting of the circuit breaker is modifiable.

In residential circuit breakers, the circuit breakers are typically calibrated to a specific current value. This requires manufacturers, distributors and retailers to build stock circuit breakers calibrated to these unique ratings. Depending upon forecasting and demand changes, this situation results in over inventory or unavailable breakers at each point in the delivery chain.

In contrast, industrial circuit breakers have used the concept of rating plugs with electronic trip units for many years to set the current ratings thereof. By inserting a rating plug, having a discrete resistance value, into a circuit breaker trip unit, the current rating is set for the industrial circuit breaker. Residential circuit breakers do not have the size or cost structure to accept rating plugs and consequently, residential circuit breakers were for practical purposes limited to a predetermined current rating.

Consequently, residential circuit breakers have traditionally used the older thermal magnetic technology which does not have ready methods for changing the current rating of the circuit breaker. The thermal trip characteristic is operative in response to overload current of extended duration which heats a bimetal member, causing movement of the latter, which in turn releases a latch to trip open a set of contacts. The magnetic characteristic is operative in response to a sudden high magnitude current overload condition, and uses the magnetic field generated in a magnetic core to attract typically an armature, which movement releases the latch to open the contacts. As an example, the magnetic type actuation occurs in response to a short circuit wherein the hot line conductor becomes directly connected with ground or neutral, bypassing the load.

In either an industrial or residential environment, it is important to provide a management system which facilitates the efficient use of electricity. In residential circuit breakers, the efficient use of electricity can be obtained by remote control of the residential circuit breaker to remove discretionary loads at the time of peak power usage. In power systems which have experienced a power outage, the return of power can be very difficult due to the large number of electrical loads which will start simultaneously, many with significant inrush current. This problem is known in the art as "cold load pickup" and can place serious stress on the electrical system due to any significant inrush which is present during the return of electrical power. Residential circuit breakers have not incorporated load control in the past as a means of alleviating or eliminating the problems associated with a cold load pickup. Past implementations of load control in residential circuit breakers have been "dumb" in that an external source of power operates a contact using a conventional solenoid or motor.

It is known to provide remote controlled circuit breakers wherein the breaker contacts are tripped to an open condition by an actuator responding to a control signal. This enables the circuit breaker to additionally perform a switching function and manage a load connected to the breaker, such that the breaker performs the dual functions of overload current protection and load management. A disadvantage of using the breaker contacts to perform a switching relay type function is that the breaker contacts are designed to be able to interrupt high current, not for repeated operation when it is desired to selectively turn the circuit breaker on or off for load control and protection against cold load pickup situations.

BRIEF SUMMARY OF THE INVENTION

In a first embodiment of the present invention, a residential circuit breaker is provided. Preferably, the residential circuit breaker comprises an electronic residential circuit breaker having a selectable current rating which permits the user to easily set and reset the current rating of the circuit breaker depending upon the desired use of the circuit breaker and the environment in which it is to be used. The current rating may be set by a number of different approaches which provide low cost, late point, or post delivery setting of the current rating. In another aspect of the present invention, the residential circuit breaker includes an effective signaling system for load control. A remote device injects a load control signal upon a line and the residential circuit breaker is adapted to receive and process the load control signal. In response to the load control signal, the residential circuit breaker will either open or close a load switch. Thus, after a power outage and the return of power, the connected loads may be staggered with respect to their return to power to eliminate problems which are associated with the simultaneous start-up of a number of loads after the return of power. In yet another aspect of the present invention, a system method for control of electrical loads for utility purposes in a customer's home over a power line carrier signaling system is presented. Discretionary loads may be taken off-line by signaling the specific residential circuit breaker to which the discretionary load is connected and directing the same to open a load switch to interrupt the flow of current to the discretionary load. Thus, the residential circuit breaker of the present invention permits the discretionary load to be taken off-line during non-trip conditions, where the circuit breaker is otherwise properly functioning.

In yet another aspect of the present invention, the implementation of common power line carrier (PLC) communications in utility revenue meters, circuit breakers, and load centers is presented. This embodiment offers an effective, low cost interface between the electrical infrastructure (utility revenue meter, load center, circuit breakers) and a home automation system for the purpose of load control. The home automation system can be signaled to place deferable loads off line during periods of peak electrical power usage by providing a load control signal to individual electronic residential circuit breakers instructing that the loads connected to these electronic residential circuit breakers be taken off line by opening the load control switch of the electronic residential circuit breaker.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 9 is a schematic block diagram illustrating a networked interface between an electronic revenue meter and power line carrier; and FIG. 10 is a schematic block diagram illustrating the networked interface of FIG. 9 having a PLC communication module.

DETAILED DESCRIPTION OF THE INVENTION

Figure 1:
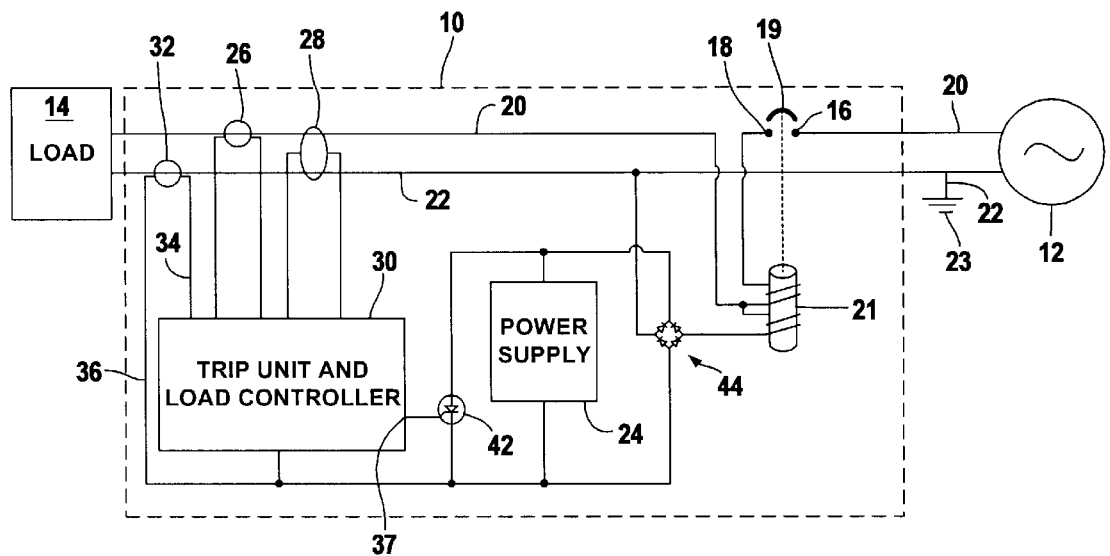
FIG. 1 is schematic block diagram of an electronic residential circuit breaker with selectable current setting in accordance with the present invention.

FIG. 1 is a schematic block diagram illustrating an electronic residential circuit breaker with selectable current setting, generally designated at 10. Electronic residential circuit breaker 10 is connected to a source 12 and at least one load 14. Source 12 provides power to at least one load 14. Electronic residential circuit breaker 10 includes first and second contacts 16 and 18, respectively, and a switch having a movable contact arm 19 and a first actuator 21 which controls the opening and closing of movable contact arm 19. In an exemplary embodiment, movable contact arm 19 which permits current to flow across contacts 16 and 18 when contact arm 19 is in a closed position. Contacts 16 and 18 and contact arm 19 serve to interrupt the flow of current within electronic residential circuit breaker 10 upon the occurrence of a triggering event ("trip event"). As is known in the art, typically the pair of contacts 16 and 18 are designed so that the occurrence of a trip event, e.g., an overcurrent condition, causes contacts 16 and 18 to separate from one another, resulting in an interruption in the flow of current in electronic residential circuit breaker 10. It being understood that the aforementioned circuit breaker contact structure 16 and 18 and movable bridge 19 are described hereinbefore for purpose of illustration only and other contact structures are equally suitable for use in the present invention, including the use of a movable and stationary contact structure. As shown in FIG. 1, first contact 16 is connected to source 12 via at least one line 20 and second contact 18 is connected to at least one load 14 via at least one line 20. The neutral terminal of source 12 is connected to load 14 via line a neutral line 22 as well as to ground 23.

At least one line 20 passes through a current sensor 26, e.g., a current transformer, which measures the current within line 20. Current sensor 26 is designed to convert the measured current signal within line 20 to a voltage representation signal. Electronic residential circuit breaker 10 further includes a differential ground fault current sensor 28. At least one line 20 and neutral line 22 pass through differential ground fault current sensor 28 which is designed to detect ground fault conditions by measuring differences between the current in neutral line 22 and not line 20 generating a signal representative of the measured current.

As is known in the art, a circuit breaker trip unit 30 is provided within electronic residential circuit breaker 10 for setting the current rating of electronic residential circuit breaker 10 of the present invention and for interrupting current flow in electronic residential circuit breaker 10 in response to the trip event. Trip unit 30 is connected to a neutral to ground (N-G) transformer 32 in which neutral line 22 and not line 20 pass through neutral to ground transformer 32. Neutral to ground transformer 32 provides signal to circuit breaker trip unit 30 via lead line 34 and has a return line 36. Circuit breaker trip unit 30 comprises any suitable electronic circuit breaker trip unit known in the art. In an exemplary embodiment, the signals generated by line current sensor 26 and differential ground fault current sensor 28 are transmitted to an A/D converter (not shown) by known means, including the use of a conductor, multiplexers, amplifiers, etc. Circuit protection and electronic current setting in accordance with the present invention include the use of a microprocessor along with RAM, ROM, and nonvolatile memory (not shown in FIG. 1) within circuit breaker trip unit 30.

Electronic circuit breaker trip unit 30 is designed to set the current rating value of electronic residential circuit breaker 10 in response to input signals received from line current sensor 26 and differential ground fault sensor 28. More specifically, electronic circuit breaker trip unit 30 generates an output trip signal at terminal 37 when predetermined trip conditions exist within electronic residential circuit breaker 10, e.g., when current flow within either of lines 20 or 22 exceeds a desired current rating value (trip event). Unlike conventional circuit breakers, electronic residential circuit breaker 10 has a selectable current setting feature. In conventional thermal-magnetic circuit breakers, the current setting for the circuit breaker can only be set at one value and therefore, this type of circuit breaker does not permit the operator to readily change the current rating of the circuit breaker. In addition, the thermal and magnetic components of thermal-magnetic circuit breakers are separate with each requiring its own calibration.

Electronic residential circuit breaker 10 further includes a silicon control rectifier (SCR) 42 which is connected to terminal 37 and receives the output trip signal generated by electronic circuit breaker trip unit 30 in response to an observed trip condition. In turn, SCR 42 is connected across the output of a first full wave bridge rectifier 44. First full wave bridge rectifier 44 connects to the windings about first actuator 21 and permits the energizing and deenergizing of first actuator 21, as described hereinafter. By connecting contact arm 19 about the windings of first actuator 21, it may be opened or closed by energizing or deenergizing first actuator 21, respectively.

Electronic residential circuit breaker 10 of the present invention provides a number of low cost approaches to representing and selectably setting the current rating. One feature of electronic circuit breaker trip unit 30 is that it is designed to convert the voltage representation signal received from current sensor 26 and differential ground fault current sensor 28 to a number of other signals. For example, the voltage representation signal may comprise a time over current representation signal $T_{toc}$ which is readily obtained in accordance with Equation (1).

$$T_{toc} = K/(I/I_{setting})^2 \quad (1)$$

where K is time to trip at $I_{setting}$,

I is the sensed current, and $I_{setting}$ is proportional to circuit breaker rating.

The voltage representation signal may also comprise an instantaneous over current representation signal $I_{ioc}$ which is really obtained in accordance with Equation (2).

$$I_{ioc} > M*I_{setting} \quad (2)$$

where M is the multiple of the $I_{setting}$ for instantaneous trip.

The time over current and instantaneous over current algorithm can be implemented with either digital or analog circuitry. Other similar algorithms can be applied by one of skill in the art to obtain the desired voltage representation signals and when predetermined fault conditions exist within electronic residential circuit breaker 10, electronic circuit breaker trip unit 30 will generate the trip signal at terminal 37.

Figure 2:
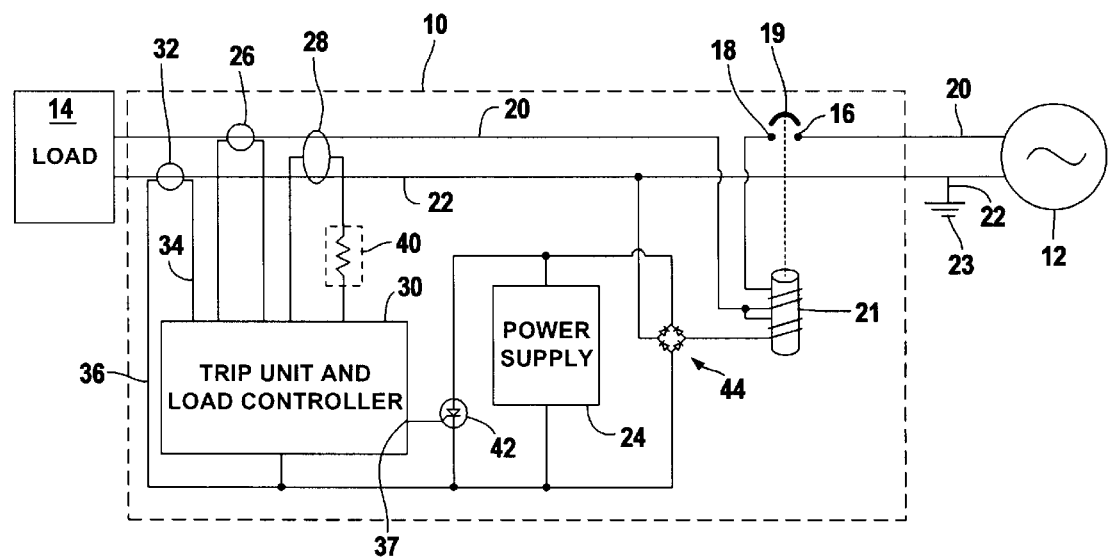
FIG. 2 is a schematic block diagram of the electronic residential circuit breaker of FIG. 1 including a rating resistor.

Now turning to FIG. 2, which illustrates a first approach utilizing a rating resistor 40 to selectably set the current rating. This approach is similar to the approach which is used in industrial circuit breakers for setting different discrete current settings in industrial circuit breakers. Rating resistor 40 is designed to change the signal from current sensor 26 to electronic circuit breaker trip unit 30 and thereby change the input signal which is processed by electronic circuit breaker trip unit 30 resulting in a different current rating being set and stored within electronic circuit breaker trip unit 30. More specifically, as the input signal to electronic circuit breaker trip unit 30 from current sensor 26 is varied, electronic circuit breaker trip unit 30 will detect $I_{setting}$ at a different level as the value of the rating resistor 40 is changed. Alternatively, one skilled in the art would understand that the input signal from current sensor 26 to electronic circuit breaker trip unit 30 may be changed by inputting rating resistor 40 into electronic circuit breaker trip unit 30 to selectably set the current rating of electronic residential circuit breaker 10 at a predetermined value.

Figure 3:
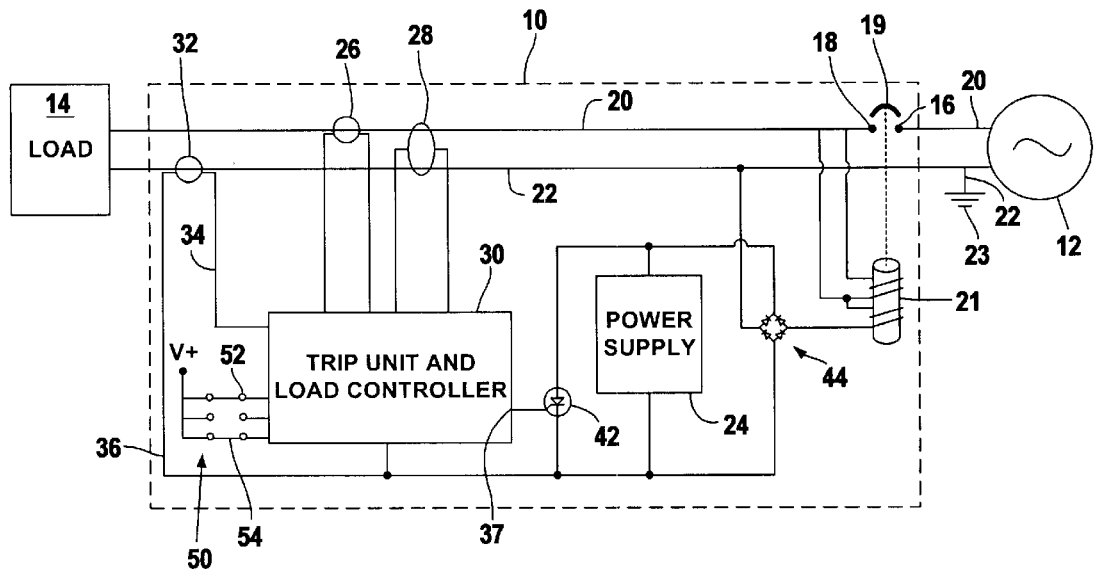
FIG. 3 is a schematic block diagram of the electronic residential circuit breaker of FIG. 1 including a plug-in current setting device.

Now turning to FIG. 3 which illustrates in accordance with the present invention, a method of providing a number of discrete settings representing current ratings. The discrete current ratings are created by providing a digital pattern to electronic circuit breaker trip unit 30. For example, with three digital input signals, a binary pattern of "1"s and "0"s can provide eight (8) different discrete current ratings (e.g., 10, 15, 20, 25, 30 amperes) to electronic circuit breaker trip unit 30. One exemplary method of providing a digital pattern to electronic circuit breaker trip unit 30 comprises using a plug-in device 50 which interfaces with terminals 52 of electronic circuit breaker trip unit 30 to produce a bit pattern representative of a specific current rating. The three digital input signals may be created by providing conducting elements 54 on plug-in device 50 so that when plug-in device 50 is inserted into terminals 52, conducting elements 54 of plug-in device 50 selectively interconnect with terminals 52 to provide a set binary pattern. Each interconnection between a single conducting element 54 and a single terminal 52 represents a bit. When conducting element 54 interconnects with terminal 52, a positive signal is conducted to electronic circuit breaker trip unit 30, wherein this positive signal is indicative of a "1". In contrast, when plug-in device 50 does not conduct a positive signal across conducting element 54, an input signal of "0" results. For example, a binary pattern of "101", as illustrated in FIG. 3, represents a single specific digital pattern which is received by and processed by electronic circuit breaker trip unit 30 as corresponding to a discrete current rating setting, e.g., 20 amperes, for electronic residential circuit breaker 10. Beneficially, plug-in device 50 can display the current rating to the user by marking the same on plug-in device 50. It is further understood that plug-in device 50 may comprise a plurality of switches capable of producing three digital input signals (8 different discrete current settings).

Figure 4:
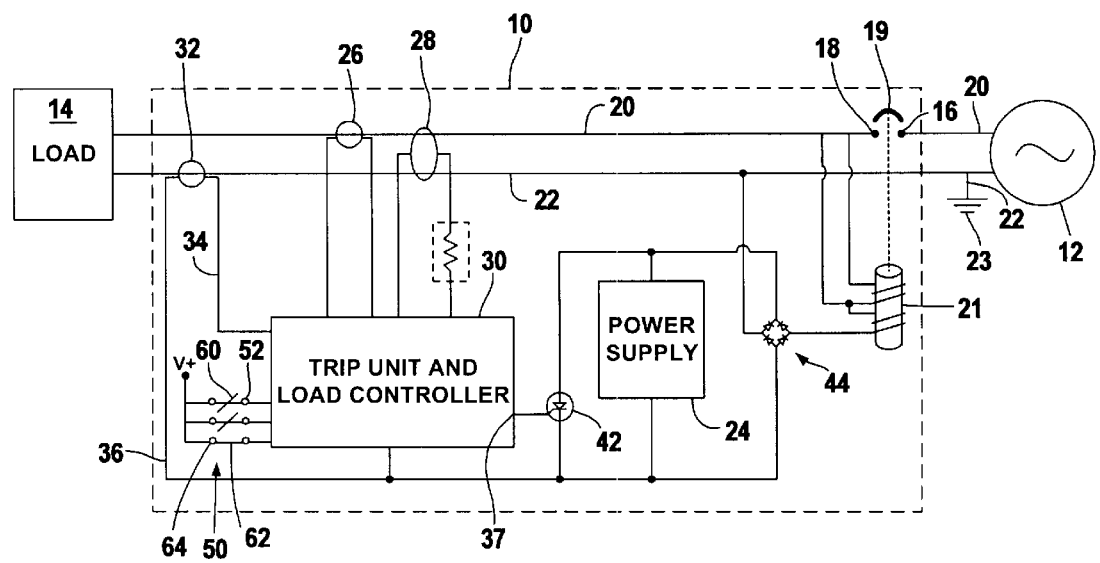
FIG. 4 is a schematic block diagram of the electronic residential circuit breaker of FIG. 1 including a plug-in current setting device with breakable links.

Yet another method of setting the current rating of electronic residential circuit breaker 10 comprises providing a digital pattern with one time setting via breakable links. This different approach of providing a digital input pattern to electronic circuit breaker trip unit 10 utilizes non-conducting elements 60 which break connections inside of electronic residential circuit breaker 10, and more specifically within electronic circuit breaker trip unit 30, as shown in FIG. 4. Depending upon the current setting desired, plug-in device 50 has zero, one, two or three non-conducting elements 60 to set the current by selectively breaking links 62 disposed at terminals 52 of electronic circuit breaker trip unit 30. Similar to the above-described digital pattern created by conducting elements 54, three digital input signals may be provided by having three non-conducting elements 60, whereby a binary pattern of "1"s and "0"s is created by selectively breaking links 62 with non-conducting elements 60 upon insertion of plug-in device 50 in terminals 64. Thus, this approach provides 8 different current ratings by selectively breaking links 62 in electronic circuit breaker control unit 30.

This approach provides a generally one-time setting of electronic residential circuit breaker 10 because once breakable links 62 are broken by the insertion of plug-in device 50, breakable links 62 may not be reconstructed; however, the digital pattern may be changed by insertion of a different plug-in device 50 which breaks existing breakable links 62 which were previously not broken by insertion of a prior plug-in device 50. Thus, insertion of a different plug-in device 50 can only lower the trip level of electronic residential circuit breaker 10.

Another aspect of digital pattern with one time setting via breakable links approach is the representation of breakable links 62 such that links 62 which are broken represent the lower current settings. In this approach, the current setting is not designed to be field replaceable. If plug-in device 50 is removed and replaced with a different plug-in device 50 that represents a higher rating, the actual trip level for electronic residential circuit breaker 10 will always be lower than the displayed setting. This arrangement assures that the user cannot, in error, create a current rating higher than the rating displayed. In this alternative approach, plug-in device 50 again will display the current rating to the user. In yet another alternative, the breakable links 62 can be broken in the factory, with no changeability available to the user.

Figure 5:
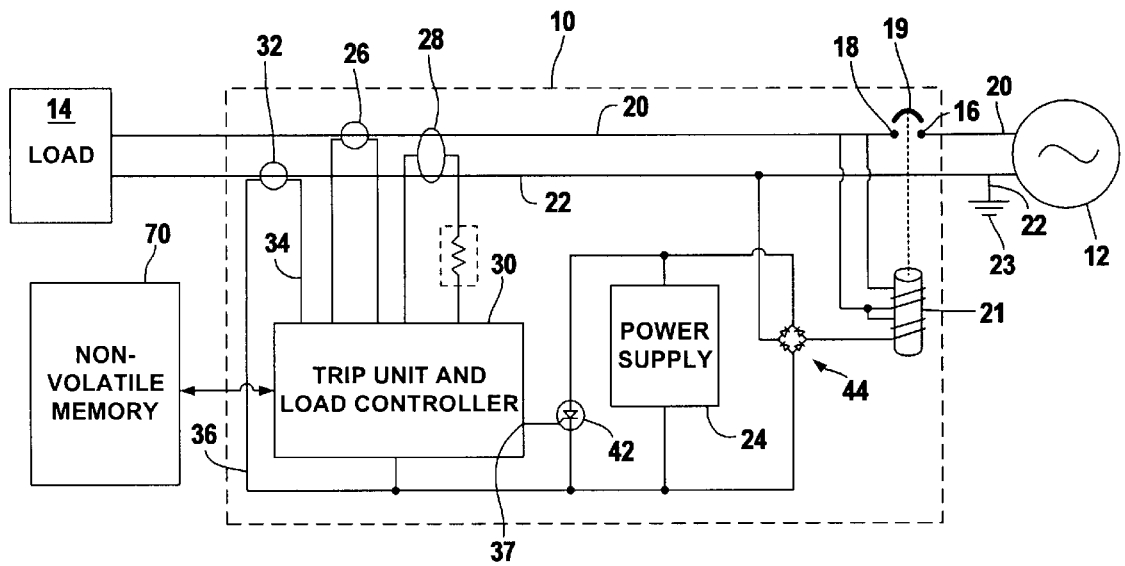
FIG. 5 is a schematic block diagram of the electronic residential circuit breaker of FIG. 1 including a non-volatile memory for setting the current rating.

FIG. 5 illustrates a fourth method of setting the current rating of electronic residential circuit breaker 10 which comprises providing a digital pattern via an electronic non-volatile memory 70. A number of discrete current ratings may be selected by providing a digital pattern to electronic circuit breaker trip unit 30 via programming digital memory. An opening or jack 72 in electronic residential circuit breaker 10 provides access for connection to electronic circuit breaker trip unit 30 which communicates with non-volatile digital memory 70. More specifically, the user inputs a digital signal into jack 72 and in response to receipt of the digital signal, nonvolatile memory 70 stores a discrete current rating. Electronic circuit breaker control unit 30 accesses non-volatile memory 70 to determine the selected current setting for electronic residential circuit breaker 10. At the factory, warehouse or point-of-sale, electronic circuit breaker control unit 30 can download the current rating to a generic circuit breaker.

Referring to FIGS. 1–5, after the current rating is set in electronic circuit breaker trip unit 30 and when electronic circuit breaker trip unit 30 detects the presence of a trip event, e.g., overcurrent condition, electronic residential circuit breaker 10 will cause movable bridge 19 to open, causing a separation between contacts 16 and 18. This separation between contacts 16 and 18 results in an interruption in current flow in electronic residential circuit breaker 10 and this interruption in current protects at least one load 14 from damage due to overcurrent conditions or other trip event conditions. As shown in more detail in FIGS. 1–5, an output trip signal from electronic residential trip unit 30 is provided at terminal 37 to a gate of a SCR (silicon control rectifier) 42. A high output signal (+5V) to the gate energizes SCR 42 to permit current flow from the anode to the cathode of SCR 42. This action and more specifically the energizing of SCR 42 shorts a first full wave rectifier 44 to energize first actuator 21. When first actuator 21 energizes, contact arm 19 separates from contacts 16 and 18 and prevents current from flowing from source 12 to at least one load 14. Power to first actuator 21 is provided by line 20.

If a low output signal "0V" is provided to the gate of first SCR 42, then the reverse occurs and first SCR 42 will deenergize resulting in the first actuator 21 deenergizing, which causes movable bridge 19 to close and permit current to flow between contacts 16 and 18. In an exemplary embodiment, contact arm 19 is closed by sending a signal to electric circuit breaker trip unit 30 directing the same to remove the high output signal being delivered to first SCR 42. By removing the high output signal to first SCR 42, the same will deenergize and cause first actuator 21 to deenergize. In addition, contact arm 19 may be reset by manually bringing contact arm 19 into contact with contacts 16 and 18.

Figure 6:
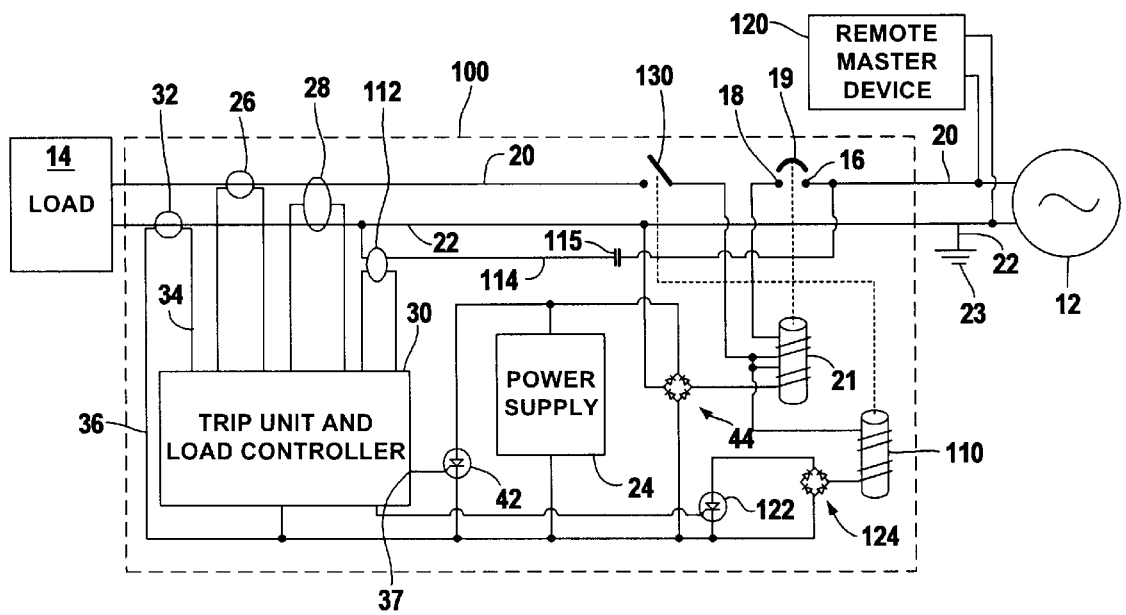
FIG. 6 is a schematic block diagram of an electronic residential circuit breaker with selectable current setting and load control.

FIG. 6 illustrates a second exemplary embodiment of electronic residential circuit breaker including a load control feature, generally designated at 100. In this embodiment, a remote master device 120 injects a signal, typically a high frequency signal, on lines 20 and 22, wherein the signal is received by electronic residential circuit breaker 100. Electronic residential circuit breaker 100 is similar to circuit breaker 10 with the notable exception that a second line operated actuator 110 provides load control separate from the breaker function of electronic residential circuit breaker 10 which protects load 14 against a trip condition, e.g., overcurrent condition. In an exemplary embodiment and similar to first actuator 21, second actuator 110 comprises an energizable solenoid. Two approaches to power line signaling are shown in FIG. 6. The first approach involves the use of an "across-the-line" high frequency transformer 112 which can inject or detect power line signals in a conventional way. High frequency transformer 112 is connected via a line 114 to first actuator 21 and when contact arm 19 is in a closed position, current flows along line 20 through first actuator 21 and line 114 to high frequency transformer 112. Line 114 includes a capacitor 115.

The operation of high frequency transformer 112 for load control occurs as follows: remote master device 120 injects the high frequency signal which "rides" on the normal 50 or 60 Hz current which travels along line 20. High frequency transformer 112 in electronic residential circuit breaker 100 detects the high frequency signal and provides a representative signal to electronic circuit breaker trip unit 30. Electronic circuit breaker trip unit 30 uses a communication protocol addressing system to determine whether the high frequency signal is intended for that specific device, in this case electronic residential circuit breaker 100. If electronic circuit breaker trip unit 30 determines that the high frequency signal is intended for electronic residential circuit breaker 100, then electronic circuit breaker trip unit 30 at terminal 39 will provide a load control signal to a gate of a second SCR (silicon control rectifier) 122. The load control signal may comprise a high output signal (+5V) delivered to the gate of second SCR 122. The load control signal in turn energizes second SCR 122 to permit the current to flow from the anode to the cathode of second SCR 122. The flow of current from the anode to the cathode of second SCR 122 shorts a second full wave bridge rectifier 124 to energize second actuator 110 of electronic residential circuit breaker 100. When second actuator 110 energizes, it is actuated causing load switch 130 to open and current is prevented from flowing along line 20 to at least one load 14. Thus, the opening of load switch 130 causes load 14 to be taken off line.

In response to the high frequency signal, electronic circuit breaker trip unit 30 will either open or close a load switch 130 based on the precise command sent from remote master device 120. The use of communication protocol addressing systems is known in the art and suitable systems may be used in electronic circuit breaker trip unit 30 of the present invention.

One of skill in the art would understand that if contact arm 19 is in an open position, then current will be prevented from flowing between contacts 16 and 18 which likewise prevents the high frequency signal riding on top of the line current from flowing to high frequency transformer 112. Consequently, load switch 130 will not be operational due to the interruption in the flow of both the current and the load control signal to electronic circuit breaker trip unit 30. In contrast, electronic residential circuit breaker 100 permits load control independent of the typical circuit breaker protection, which is also offered by circuit breaker 100, by providing the above-described system which permits the user to open and close load switch 130 when circuit breaker 100 is operating under normal, non-trip conditions and current is freely flowing through contacts 16 and 18. This action results from providing a high frequency signal via power line 20 to electronic circuit breaker trip unit 30 which in turn injects and sends a load control signal to open load switch 130. By removing the load control signal, the load switch 130 will close and current will flow to at least one load 14.

A second approach to power line signaling for load involves the dual use of the dormant oscillator coil (current transformer) 32 which can inject and detect signals propagated on neutral (ground) line 22. Neutral line 22 is much quieter than current line 20 and may be effectively used to transmit signals from remote master remote 120 to dormant oscillator coil 32. This second approach offers advantages over conventional power line carrier signaling, discussed previously herein, in that dormant oscillator coil 32, a necessary part of ground fault technology, receives dual use in this approach. In addition, the neutral to ground propagation path (along line 22) typically is electrically quieter and more reliable as a power line carrier signaling path.

In this second approach to signaling, remote master device 120 injects a signal upon neutral/ground line 22. Typically, the injected signal comprises a high frequency signal which "rides" on the top of the normal 50 or 60 Hz current which travels along line 22. Dormant oscillator coil 32 detects the high frequency signal and injects a representative signal to electronic circuit breaker trip unit 30. Using the above-described communication protocol addressing system, electronic circuit breaker trip unit 30 determines whether the high frequency signal is intended for that specific device, in this case electronic residential circuit breaker 100. In response to the high frequency signal, electronic circuit breaker trip unit 30 will either open or close a load switch 130 based upon the precise command sent from remote master device 120. The opening and closing of load switch 130 in accordance with this second signaling approach is essentially identical to the first signaling approach.

Figure 7:
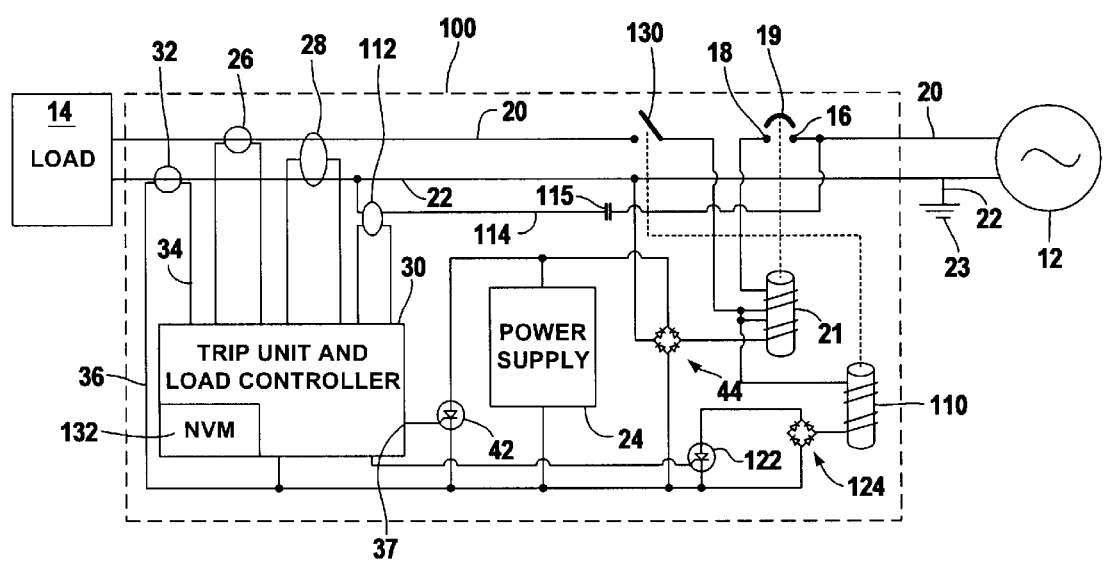
FIG. 7 is a schematic block diagram the electronic residential circuit breaker of FIG. 6 with an electronic load control feature.

Now turning to FIG. 7, a second load control feature of the present invention is directed to the use of electronic-based circuit breaker 100 of the present invention. This aspect of the present invention does not depend on the power line carrier for controlling load switch 130, but does depend on electronic control embedded in electronic residential circuit breaker 100, preferably in electronic circuit breaker trip unit 30. On loss of power to at least one load 14 due to an event, such as a power outage, electronic residential circuit breaker 100 of the present invention is adapted to remember the state of at least one load 14 prior to loss of power. There are a number of non-volatile approaches which permit memory of the prior state of at least one load 14, wherein these approaches are both electronic and mechanical in nature, e.g., NVRAM or EEPROM electronic memories or latching relays. This is important because customer loads should not be removed and required to have a directed command to operate after a power loss and return of power. It is desirable to avoid having to send a directive command signal addressed to each specific electronic circuit breaker 100 in order to operate the same after the return of power. To address the specific problem of cold pickup, previously discussed hereinbefore, the present invention provides a method for controlling load switch 130 of electronic residential circuit breaker 100 after the loss of power to the same and to at least one load 14.

More specifically, the present invention provides two separate methods for controlling load switch 130 after loss of power. In the first approach, on loss of power, the status of load switch 130 is stored in nonvolatile memory 132 which forms a part of electronic circuit breaker trip unit 30. On return of power, the status is recalled from nonvolatile memory 132. If load switch 130 was closed prior to the event causing loss of power, the microprocessor (circuit breaker electronics) in electronic circuit breaker control unit 30 waits for a fixed time period to allow remote master device 120 to provide an OFF signal to electronic residential circuit breaker 100, more specifically, to electronic circuit breaker trip unit 30 and subsequently stagger the reapplication of loads 14 in the customer's home to improve the electric utility's cold load pickup. If load switch 130 was open prior to the event causing loss of power, the microprocessor in electronic circuit breaker control unit 30 awaits for a fixed time period to allow remote master device 120 to provide a signal to load switch 130 indicating that load switch 130 should close.

An alternative and second approach for controlling the operation of load switch 130 after loss of power comprises using the microprocessor in electronic circuit breaker trip unit 30 to store and recall the status of load switch 130, then wait a randomized time period prior to closing load switch 130. This has a similar effect as the first approach; however, this second approach does not require the intervention of remote master control 120. Thus, load switch 130 is controlled and the reapplication of the loads are staggered without having to generate and send a directive command signal from remote master control 120. Accordingly, the reapplication of the loads are staggered by incorporating a randomized time period into the microprocessor, wherein after the randomized time period passes, electronic circuit breaker trip unit 30 sends a load control signal, by the method disclosed hereinbefore, which closes load switch 130 and brings load 14 back on line.

Figure 8:
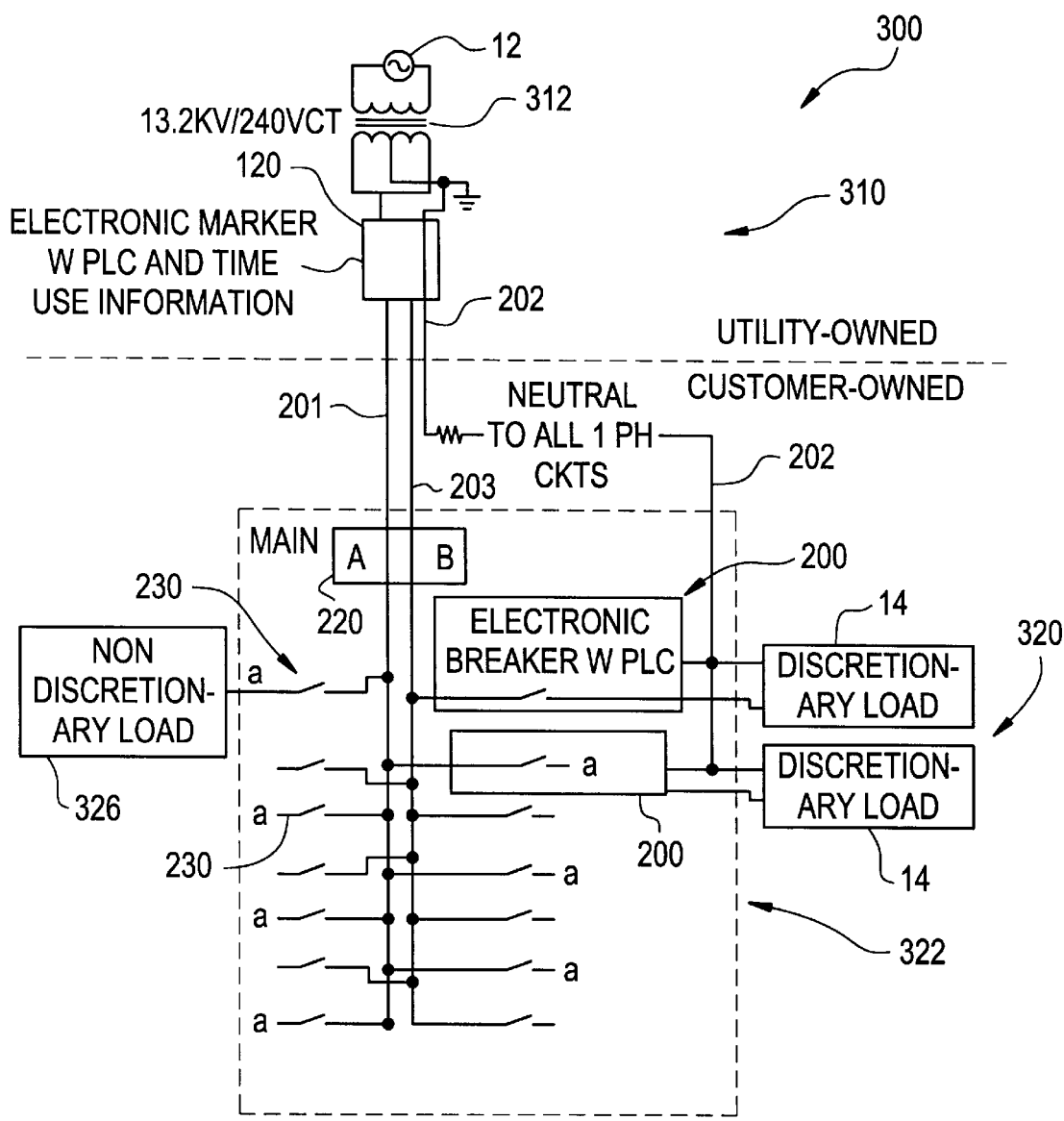
FIG. 8 is a schematic block diagram illustrating a method for control of electrical loads for utility purposes in the home.

Turning to FIG. 8, in yet another aspect of the present invention, a system method for control of electrical loads for utility purposes in a customer's home over a power line carrier signaling system is presented. As is known in the art, a typical power distribution system 300 comprises utility-owned components 310 and customer-owned components 320. Utility-owned components 310 include power source 12 which is usually connected to a number of transformer 312 for distributing the power locally. Transformer 312 is connected to local master device 120 which is connected to and regulates a number of customer-owned electrical distribution devices. In an exemplary embodiment, master device 120 comprises an electronic residential meter. It being understood that master device 120 may comprise other devices besides an electronic residential meter, which is shown for purposes of illustration only. Electronic residential meter 120 can be programmed to have time-of-use schedules embedded within the electronics (microprocessor, etc.) of device 120 which directs electronic residential meter 120 to regulate energy differently at typical times of peak usage. Electronic residential meter 120 is also capable of being signaled directly from the utility or another master control device (not shown) to indicate peak loads. With knowledge of peak periods with either approach, the utility signals its desire to turn off discretionary loads to ease the delivery of power for times of peak usage or other utility needs. Utilities often offer rate incentives to customers who will allow such control.

In an exemplary embodiment, the utility signals electronic residential meter 120 by sending a command signal to the same, which can, in turn, signal at least one individual residential circuit breakers 200 over power line carrier to open their respective load circuits, thereby causing an interruption in current flow to the load which is connected to this particular individual residential circuit breaker 200 (which include power line carrying module). Accordingly, selective individual residential circuit breakers 200 may be taken off line by such a method and system of the present invention has been described hereinbefore. Electronic residential meter 120 signals individual residential circuit breakers 200 via line 202 which in this case comprises a neutral ground line. In addition, electronic residential meter 120 is also connected to a main local breaker 220 which is designed to regulate the distribution of local power, in that, if main local breaker 220 is signaled to go offline, then power to all individual circuit breakers 200 is likewise terminated. Line 201 is a power line for providing power to load center 322.

FIG. 8 depicts this arrangement simply. Electronic residential meter 120 has time-of-use information and a power line carrier (PLC) module. During a period of peak loading, electronic residential meter 120 sends power line carrier signals via neutral/ground line 202 to turn off the discretionary loads. These PLC signals are applied on the utility-owned side 310. Customer-owned components 320 include a customer-owned load center 322 having a number of electronic circuit breakers with load control devices 200 which receive the PLC signal and turn the respective load off. By using a power line carrier, not only is the situation of retrofit eased, but the traditional utility/customer separation between electronic metering device 120 and customer load center 322 is maintained.

As shown in FIG. 8, customer-owned load center 322 may also include a number of conventional circuit breakers 230. Electronic metering device 120 is connected to main local breaker 220. The exemplary embodiment shown in FIG. 8 shows two phases, namely a first phase line 201 (phase A) and a second phase line 203 (phase B). It being understood that there may be more than 2 phases, e.g., 3 phases, into customer-owned load center 322. Discretionary loads are connected to electronic circuit breaker with load control 200 and non-discretionary loads 326 are preferably attached to one of conventional circuit breakers 230. Each of phase lines 201 and 203 has a predetermined number of circuit breakers connected thereto. Either electronic circuit breaker 200 or conventional circuit breaker 230 is electrically connected to either of phase lines 201 or 203. In other words, first phase line 201 may have a combination of both conventional circuit breakers 230 and electronic circuit breakers 200 and likewise second phase line 203 may have a combination of types of circuit breakers, e.g., conventional circuit breakers 230 and electronic circuit breakers 200. Accordingly, for any load on any of the phases 201 or 203, electronic circuit breaker 200 may be electrically connected thereto if it is desired that this particular load should be designated as a discretionary load 14 instead of a non-discretionary load 326 and thus may be taken off line by the power line carrying signaling described hereinbefore. This permits versatility in selecting and configuring customer-owned load center 322 so that discretionary loads 14 are connected to electronic circuit breaker 200. Advantageously, this arrangement permits the discretionary loads 14 to be taken off-line under non-trip conditions, e.g., peak usage, by methods described hereinbelow. In one exemplary embodiment, individual circuit breakers 200 preferably comprise residential circuit breaker 10 or 100 described hereinbefore.

The designation of electronic circuit breaker 200 as a discretionary load can be achieved in several ways. One approach employs a non-volatile memory, programmable over a communication bus, which in this case comprises neutral line 202. The non-volatile memory is designed to store the state as a discretionary load, wherein the non-volatile memory is disposed within an electronic circuit breaker trip unit of electronic circuit breaker 200. A second alternative approach involves a group of physical locations in load center 220 which provide a physical connection or actuation on electronic circuit breaker 200 via some physical element to indicate discretionary or non-discretionary loads. A third approach would use unique discretionary versus non-discretionary circuit breaker products that are programmed in the factory to accept or ignore a load control signal. Thus, the circuit breaker electronics are designed such that the electronic circuit breaker trip unit of the discretionary circuit breaker is programmed to read and process the load control signal, whereby the electronic circuit breaker trip unit directs load switch 130 to open and place the non-discretionary load off-line. In contrast, the electronics of the non-discretionary circuit breaker are designed such that the load control signal is not read and processed when the load control signal is sent by electronic residential meter (local master device) 120 to all the individual electronic residential circuit breakers 200. As a result, the non-discretionary loads connected to a respective non-discretionary circuit breaker are maintained on-line when the load control signal is sent. It being understood that other means for designating electronic circuit breaker 200 as a discretionary load are within the scope of the present invention.

Now turning to FIG. 9 which illustrates yet another feature and embodiment of the present invention. In this embodiment, the present invention provides an effective, low cost interface between electrical infrastructure (utility revenue meter, load center, circuit breakers) and home automation systems for the purpose of load control. Home automation systems solutions typically involve solutions purchased by building owners after the installation of the electrical system. As such, these solutions do not effectively address control of "home run" circuits, that is circuits which are wired directly from the load center due to their large current carrying requirements or higher voltages (240V vs 120V). For example, ranges, water heaters, HVAC and dryers comprise loads which may be wired directly. At the same time, rapidly deregulating utilities look for ways to improve their efficiency by reducing peak loads which draw on higher cost energy sources. These utilities seek time-of-use (TOU) meters, which are common in the industry to encourage customers to reduce peak loads. Traditionally, there is no direct link or effective control between the utility owned meters and the customer owned electrical systems. None of the power line carrier-based home automation systems interact directly with electrical load centers, circuit breakers or utility revenue meters.

The load control offered by the present invention can implement energy savings, convenience or safety. In addition, the present inventions provides an effective low cost interface between the utility owned revenue meter and the electrical load center and its circuit breakers, again for load control in the situation where home automations systems are unavailable or unacceptable to the utility as a control device.

FIG. 9 depicts this arrangement simply. One customer-owned component 320 is a home automation system 330 which is connected to local master device 120 which preferably comprises an electronic residential meter. In the case of electronic residential meter 120, access to both power line 201 and neutral line 202 are normally available, but electronic residential meter 120 may be located outside of the customer's building where additional wires are inconvenient to install. To avoid tampering, utilities prefer to limit access to the inside of electronic residential meter 120, complicating the direct wiring. In accordance with the present invention, a power line communication system (PLC) provides wireless interface into the customer building. Electronic residential meter 120 may be employed in two ways in this invention. In the first, electronic residential meter 120 provides load control signals over power line carrier 201 to home automation system 330. Based on the arrangement with the local utility, home automation system 330 may place deferable loads (water heater, dryer, etc.) off line during periods of peak electrical usage. Home automation system 330 may control these deferable loads directly, as in the case of smart loads, e.g., smart water heaters or home automation system 330 may control the deferable loads via PLC enabled customer load center 322.

Power is provided to home automation system 330 via power line 201 which also carries the high frequency signal to home automation system 330. Home automation system 330 receives the high frequency signal and is designed as a "smart" system which includes a communications addressing protocol system so that in response to receiving the high frequency signal, home automation system 330 generates a load control signal at terminal 332 which is delivered to the corresponding electronic circuit breaker with load control devices 200. A number of electronic circuit breakers with load control devices 200 form a part of PLC enabled customer load center 322 and upon receipt of the load control signal, the electronic circuit breaker 200 may be directed to take the connected load off line by actuating the load control switch (not shown) thereof. Preferably electronic circuit breaker 200, which preferably comprises the electronic residential circuit breaker 10 or 100 described previously herein, wherein a load control signal is designed to to take the deferable load 14 off line.

Now turning to FIG. 10, another embodiment of the present invention is featured. In this embodiment, customer owned components 320 includes a PLC communications module 340 which is supported by customer-owned load center 322. PLC communications module 340 can communicate either with electronic residential meter 120 or home automation system 330 to receive command signals to operate remote controlled circuit breakers 350 of a simpler type (load control operated by an internal solenoid or drive motor). This implementation involves more wiring than the full PLC approach but may offer some advantages in retrofit applications. In this embodiment, electronic residential meter 120 acts more like a traditional meter device and PLC communications module 340 acts as a "smart" device which receives the command signals and because of addressing communication systems is capable of operating the number of remote controlled circuit breakers 350. During periods of peak electrical usage, individual remote controlled circuit breakers 350 connected to deferable loads 14 are signaled via a load control signal directing that their load control switch opens resulting in deferable load 14 being taken off line.

In yet another feature of the present invention, the power line carrier enabled circuit breakers 200 described hereinbefore with reference to FIGS. 1–8 are expanded further to accept encrypted messages from electronic residential meter 120 or home automation system 330 to ensure loads 14 can be reliably taken off line without tampering at the utility's command. These devices are further expanded to provide secure load status, including but not limited to on-off state, nominal load and diagnostic information such as number of operations and number of fault operations. Alternatively, the PLC-enabled breakers may communicate with home automations system 330 without direct utility control for convenience (lighting control), safety (lighting patterns, deenergization of certain loads during fire) and energy cost avoidance, implementing load shedding at the user's discretion to avoid peak energy costs. In this feature of the present invention, similar load shedding approaches would be used as in the previously described instance where the utility-controlled system was presented.

While preferred embodiments have been shown and described, various modifications and substitutions may be made thereto without departing from the spirit and scope of the present invention. Accordingly, it is to be understood that the present invention has been described by way of illustrations and not limitation.

What is claimed is:

1. A circuit breaker having a load control feature, comprising:

a power conductor connected between a line terminal and a load terminal;

a current sensor configured to sense current in said power conductor;

a transformer for sensing communications transmitted via power line carrier;

a trip unit receptive to output of the current sensor and the communications, said trip unit generating a trip signal upon sensing an overcurrent fault condition, and a load control signal in response to a load control message encoded in said communications;

a separable pair of overcurrent circuit breaker contacts connected to said power conductor;

a first actuator mechanically linked to said pair of overcurrent circuit breaker contacts, said first actuator causing said overcurrent circuit breaker contacts to separate, thereby electrically disconnecting said load terminal from said line terminal, in response to said trip signal;

a load control switch connected in series with said overcurrent circuit breaker contacts; and a second actuator mechanically linked to said load control switch, said second actuator causing said load control switch to open in response to said load control signal.

2. The circuit breaker of claim 1, wherein each of the first and second actuators comprise a solenoid.

3. The circuit breaker of claim 1 further comprising a neutral to ground conductor connected between a second line terminal and a second load terminal, said transformer for sensing communications comprises a neutral to ground transformer, said trip unit receiving said power line carrier communications via said neutral to ground transformer.

4. The circuit breaker of claim 1 wherein said transformer for sensing communications comprises a high frequency transformer connected in series with a capacitor between said power conductor and ground, said high frequency transformer having a secondary winding connecting to said trip unit for providing said communications.

5. The circuit breaker of claim 1 further comprising a communication protocol addressing system to determine if said communications is intended for the circuit breaker, said electronic circuit breaker trip unit being programmed to disregard communications not intended for said circuit breaker.

6. The circuit breaker of claim 1, wherein said electronic circuit breaker trip unit further includes:

a non-volatile memory for storing a state of at least one predetermined load upon a loss of power.

7. A method of protecting and controlling a electrical load, comprising:

sensing a current in a power conductor connected between a line terminal and a load terminal of a circuit breaker using a current sensor;

sensing for communications transmitted via power line carrier;

passing a signal from said current sensor to an electronic trip unit;

passing, said communications to said electronic trip unit;

outputting from said trip unit a trip signal when said trip unit detects an overcurrent fault condition;

outputting from said trip unit a load control signal when said trip unit receives a load control message encoded in said communications;

operating a first actuator in response to said trip signal, said first actuator being mechanically linked to a pair of overcurrent circuit breaker contacts that are connected between said first line terminal and said first load terminal, said first actuator thereby electrically disconnecting said line terminal from said load terminal;

operating a second actuator in response to said load signal, said second actuator being mechanically linked to a load control switch connected to said power conductor in series with said pair of overcurrent circuit breaker contacts, thereby opening and closing said load control switch.

8. The method of claim 7, wherein each of the first and second actuators comprise a solenoid.

9. The method of claim 7 wherein said sensing for communications comprises using a neutral to ground transformer to sense current in a neutral to ground conductor, thereby detecting high frequency messages transmitted via power line carrier.

10. The method of claim 7 wherein said sensing for communications comprises using a high frequency transformer connected in series with a capacitor between said power conductor and ground, to detect high frequency messages transmitted via power line carrier.

11. The method of claim 7 further comprising determining if said communications is intended for the electronic circuit breaker using a communication protocol addressing system and disregarding said communications if said communications is not intended for the circuit breaker.

12. The method of claim 7, wherein further comprising:
storing the state of at least one predetermined load upon a loss of power in non-volatile memory.

* * * * *